(12) United States Patent
Saarnia et al.

(10) Patent No.: US 6,438,884 B1
(45) Date of Patent: Aug. 27, 2002

(54) CORNER ARRANGEMENT FOR FRAME SECTIONS

(75) Inventors: Jouni Saarnia, Lahti; Kalevi Ruuhijoki, Villähde, both of (FI)

(73) Assignee: Teknoware Oy (FI)

( * ) Notice: Subject to any disclaimer, the term of this patent is extended or adjusted under 35 U.S.C. 154(b) by 0 days.

(21) Appl. No.: 09/543,685

(22) Filed: Apr. 5, 2000

(30) Foreign Application Priority Data

Apr. 6, 1999 (FI) ................................. 990753

(51) Int. Cl.[7] .................................. A47G 1/10
(52) U.S. Cl. ........................... 40/785; 403/403
(58) Field of Search .................. 40/782, 784, 785, 40/155; 403/401, 402, 403

(56) References Cited

U.S. PATENT DOCUMENTS

| | | | |
|---|---|---|---|
| 2,654,451 A | * 10/1953 | Schmidgall | ........... 40/785 |
| 3,965,601 A | 6/1976 | Nielsen | |
| 4,122,617 A | 10/1978 | Nielsen | |
| 4,718,184 A | 1/1988 | Sherman | |
| 4,859,109 A | * 8/1989 | Targetti | ........... 403/297 |
| 5,384,978 A | * 1/1995 | Peters | ........... 40/785 |
| 5,423,626 A | * 6/1995 | Peters | ........... 40/784 X |

FOREIGN PATENT DOCUMENTS

| | | |
|---|---|---|
| DE | 26 45 834 | 11/1977 |
| DE | 42 211 770 A1 | 4/1992 |
| EP | 0 903 505 | 9/1998 |
| GB | 1 040 834 | 9/1966 |
| SE | 904 045-5 | 5/1991 |

\* cited by examiner

*Primary Examiner*—Brian K. Green
(74) *Attorney, Agent, or Firm*—Leydig, Voit & Mayer, Ltd.

(57) ABSTRACT

A corner arrangement for frame sections for securing together two frame sections (1, 2) located at an angle with respect to each other by means of a corner piece (3) comprising two legs (3a, 3b) located at a desired angle with respect to each other, the legs being arranged to be received by axial grooves (5) in the frame sections (1, 2) and both being equipped with at least one locking screw (4) in order to lock the corner piece (3) with respect to the frame sections. A point (6) of the locking screw (4) is of the shape of a cone or a truncated cone, and a counter surface (8) of the 10 locking screw in the frame section (1, 2) is correspondingly inclined with respect to the shape of the point of the locking screw such that the screw (4) subjects the profile (1, 2) to a force which forces the profile in the direction of the inner corner defined by the profiles therebetween.

5 Claims, 1 Drawing Sheet

Direction A

US 6,438,884 B1

CORNER ARRANGEMENT FOR FRAME SECTIONS

BACKGROUND OF THE INVENTION

The invention relates to a corner arrangement for frame sections for securing together two frame sections located at an angle with respect to each other by means of a corner piece comprising two legs located at a desired angle with respect to each other, the legs being arranged to be received by axial grooves (5) in the frame sections and both being equipped with at least one locking screw in order to lock the corner piece with respect to the frame sections.

A corner arrangement for frame sections of the kind described above is used in different connections, such as in corner arrangements of frames for pictures and photographs. Although an arrangement of this type is typically relatively stiff, the problem is that a crack is easily formed between the frame sections, the size of the crack varying according to the arrangement. The gaps can be removed by existing methods but they are often expensive and laborious.

BRIEF DESCRIPTION OF THE INVENTION

An object of the present invention is to provide a corner arrangement for frame sections, the structure of the arrangement being such that it can be reliably used to avoid a crack between the frame sections and, on the other hand, to provide an arrangement that can be readily opened and re-secured. This is achieved by a corner arrangement of the invention, which is characterized in that the point of the locking screw is of the shape of a cone or a truncated cone, and a counter surface of the locking screw in the frame section is correspondingly inclined with respect to the shape of the point of the locking screw such that the screw subjects the profile to a force which forces the profile in the direction of the inner corner defined by the profiles therebetween.

The underlying idea of the corner arrangement of the invention is that the point of the locking screw is, unconventionally, given the shape of a cone or a truncated cone such that, as it corresponds to the inclined surface formed in the frame section, it forces the frame section in the direction of the inner corner defined by the frame sections therebetween. In this manner, tightening the locking also automatically removes the gap or crack from a joining point of the frame sections.

Most preferably, the counter surface of the locking screw in the profile is formed from one side of a locking groove which has the shape of a wedge or a truncated wedge and which is located at the bottom of the groove of the frame section. In this manner, the inclined counter surface for the frame section is simply and efficiently provided since it is formed from a part of the shape of the profile itself, thus being uniform and unchanging along the entire length of the frame section. Hence, the frame section can be cut at any desired point without putting the functionality of the corner arrangement of the invention at risk.

LIST OF DRAWINGS

Figure 1:
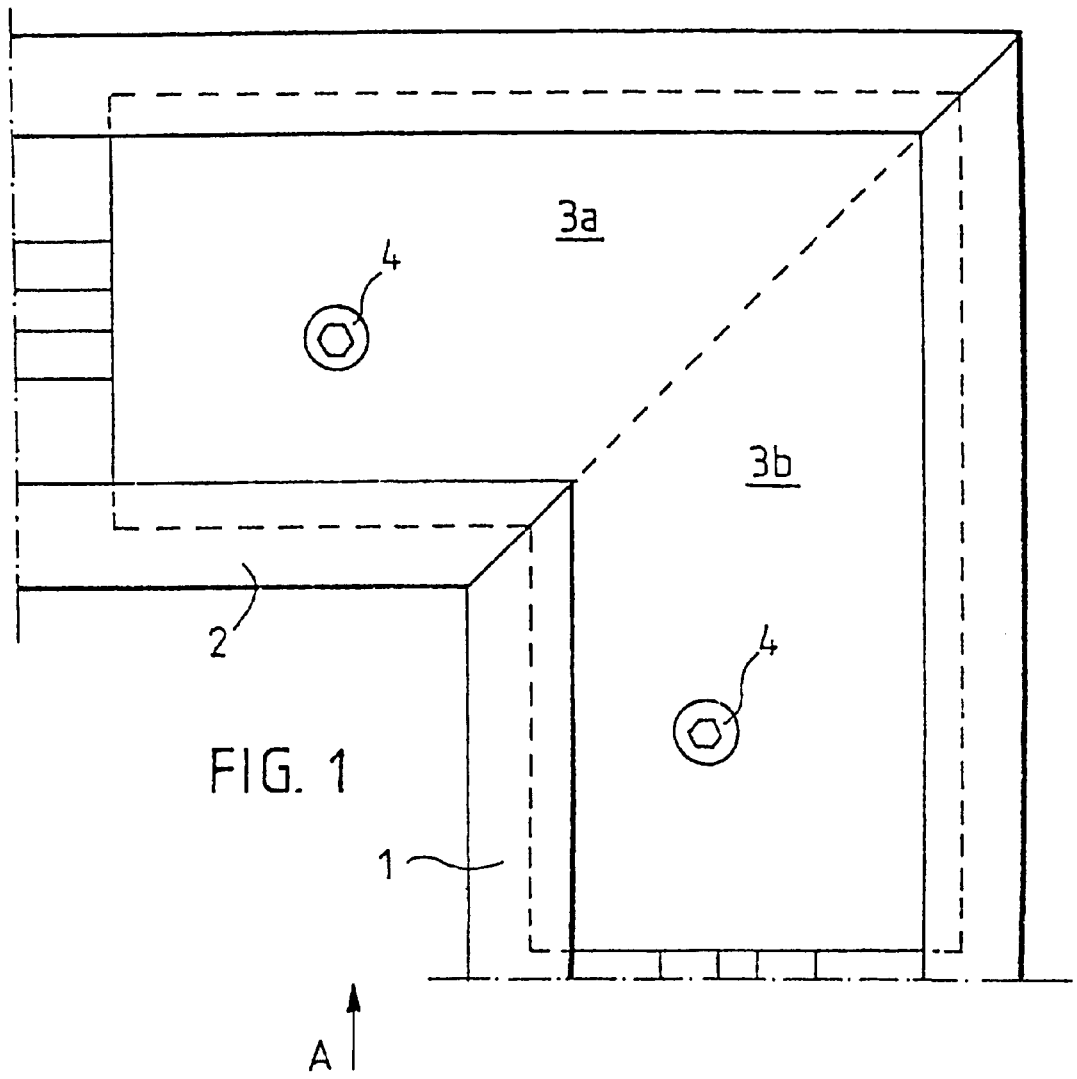
Figure 2:
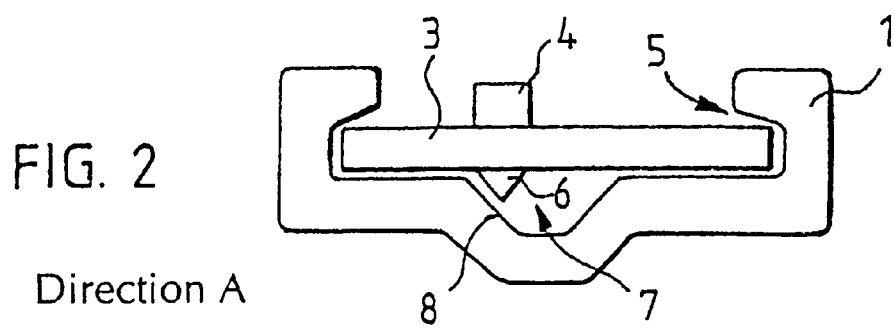

In the following, a corner arrangement of the invention will be described in closer detail with reference to the accompanying drawing, in which FIG. 1 shows a completed corner arrangement of the invention as seen from below, and FIG. 2 shows the corner arrangement according to FIG. 1 as seen in the direction of arrow A of FIG. 1.

DETAILED DESCRIPTION OF THE INVENTION

FIG. 1 shows a corner arrangement of the invention between two frame sections. The present corner arrangement is provided by a corner piece 3 comprising legs 3A and 3B. For the legs of the corner piece 3, both frame sections, which do not have to be identical, comprise grooves 5 corresponding to the dimensioning of the legs of the corner piece, the grooves receiving the legs of the corner piece in the axial direction of the profile. As is apparent from FIG. 1, surfaces settling against each other at the corner arrangement of the frame sections have been cut such that the frame sections settle at a desired angle with respect to each other. Most typically, and also in FIG. 1, this angle is 90°. Consequently, the legs 3A and 3B of the corner piece are at an angle of 90° with respect to each other.

In order to lock the legs 3A and 3B with respect to the frame sections 1 and 2, they both have been provided with a threaded drilling with a locking screw 4 being arranged thereto. In a manner shown by FIG. 2, a point 6 of the locking screw 4 is cone-shaped. It could also be of the shape of a truncated cone. The counter surface of the locking screw at the bottom of the groove 5 of the frame section 1 is inclined, corresponding to the inclination of the point 6 of the locking screw 4 such that this end 6, when the screw is turned against its counter surface, subjects the frame section to a force which tries to move the frame section in the direction of the inner corner defined by the frame sections 1 and 2 therebetween.

Most preferably, the counter surface 8 of the locking screw 4 in the frame section 1 is formed from one side of a groove 7 which has the shape of a wedge or a truncated wedge and which is located at the bottom of the groove 5 of the frame section. In this manner, the counter surface 8 is integrated into the structure of the profile itself, thus being uniform along the entire length of the profile.

In FIG. 1, both legs 3A and 3B of the locking piece 3 are shown to comprise only one locking screw 4, but it should be understood that there could be more of them on the same axial line, which is parallel with the grooves 7 located in the frame sections.

The corner arrangement of the invention is described by way of example by means of only one embodiment, and it should be understood that it can be modified in many ways in terms of the shape of the profile as well as of the corner piece 3 without deviating from the scope defined by the attached claims. As long as the frame section and the joining piece 3 in themselves are compatible, the cross-section profile thereof is irrelevant. The most essential feature of the corner arrangement of the invention is that the locking screw is shaped such that it is able to subject the frame section to a force which forces the frame section in the direction of the inner corner formed by the frame sections therebetween, thus automatically eliminating a gap or a crack between the frame sections at the joining point.

What is claimed is:

1. A frame assembly comprising two frame sections (1, 2) located at an angle with respect to each other, said frame sections each having a respective abutment surface for positioning adjacent the abutment surface of the other frame section, a corner arrangement for securing the frame sections together, said corner arrangement including a corner piece (3) having two legs (3a, 3b) located on angle to each other, said frame sections (1, 2) each having a longitudinal groove (5) for receiving a respective leg (3a, 3b) of the corner piece (3), said corner piece legs (3a, 3b) each having at least one locking screw (4) for locking the corner piece (3) to the frame sections (1, 2), said at least one locking screw (4) having a tapered end which comprises at least a portion of a cone, and said frame sections (1, 2) each having a counter surface (8) inclined relative to a respective at least one locking screw (4) such that rotation of the locking screw (4) to a locking position forces the frame section abutment surfaces together.

2. The frame assembly of claim 1 in which the end of each of said at least one locking screw is in the form of a cone.

3. The frame assembly of claim 2 in which each incline of said counter surface (8) corresponds to the angle of the conical end of the respective locking screw.

4. The frame assembly of claim 1 in which each frame section counter surface (8) is defined by a wedge-shaped groove formed in the frame section (1, 2).

5. The frame assembly of claim 4 in which the wedge-shaped groove of each frame section (1, 2) is located at the bottom of the frame section.

* * * * *